United States Patent
Hotta et al.

(10) Patent No.: US 6,846,471 B2
(45) Date of Patent: Jan. 25, 2005

(54) CATALYST FOR DECOMPOSING NITROUS OXIDE, PROCESS FOR PRODUCING THE SAME AND METHOD FOR DECOMPOSING NITROUS OXIDE

(75) Inventors: Masatoshi Hotta, Kanagawa (JP); Masakazu Oka, Kanagawa (JP); Yoshio Furuse, Kanagawa (JP); Hitoshi Atobe, Kanagawa (JP); Shigehiro Chaen, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 23 days.

(21) Appl. No.: 09/947,540

(22) Filed: Sep. 7, 2001

(65) Prior Publication Data

US 2002/0051742 A1 May 2, 2002

Related U.S. Application Data

(60) Provisional application No. 60/241,748, filed on Oct. 20, 2000.

(30) Foreign Application Priority Data

Sep. 8, 2000 (JP) .......................... 2000-272615
Jun. 14, 2001 (JP) .......................... 2001-180165

(51) Int. Cl.$^7$ .............................. B01J 8/00; B01J 23/32; B01J 23/40; B01J 23/42; B01J 23/58
(52) U.S. Cl. .................... 423/239.1; 502/324; 502/326; 502/327; 502/328; 502/329; 502/332; 502/335; 502/336; 502/341
(58) Field of Search .............................. 502/232–263, 502/300–355; 423/210, 210.5, 237, 238, 239, 239.1, 239.2

(56) References Cited

U.S. PATENT DOCUMENTS

| | | | | | |
|---|---|---|---|---|---|
| 3,806,582 | A | * | 4/1974 | Acres et al. ................ | 423/239 |
| 3,839,225 | A | * | 10/1974 | Acres ......................... | 252/432 |
| 3,886,260 | A | * | 5/1975 | Unland ...................... | 423/215.5 |
| 3,951,860 | A | * | 4/1976 | Acres et al. ................ | 252/432 |
| 4,076,792 | A | * | 2/1978 | Foster et al. .............. | 423/215.5 |
| 4,117,081 | A | | 9/1978 | Inaba et al. | |
| 4,259,303 | A | * | 3/1981 | Nakaji et al. .............. | 423/239 |
| 4,274,981 | A | | 6/1981 | Suzuki et al. | |
| 5,137,703 | A | * | 8/1992 | Lichtin et al. ............ | 423/239.1 |
| 5,149,512 | A | * | 9/1992 | Li et al. .................... | 423/239.2 |
| 5,736,482 | A | * | 4/1998 | Durand et al. ............ | 502/303 |
| 6,217,838 | B1 | * | 4/2001 | Bourges et al. .......... | 423/239.1 |
| 6,419,890 | B1 | * | 7/2002 | Li ............................. | 423/239.1 |
| 2001/0016554 | A1 | * | 8/2001 | Takeuchi | |
| 2002/0051742 | A1 | * | 5/2002 | Hotta et al. | |

FOREIGN PATENT DOCUMENTS

| | | |
|---|---|---|
| JP | B2 61-45486 | 10/1986 |
| JP | B2 61-45487 | 10/1986 |
| JP | 61-278352 | * 12/1986 |
| JP | A 2-068120 | 3/1990 |
| JP | A 4-363143 | 12/1992 |
| WO | WO 00/23176 A1 | 4/2000 |

OTHER PUBLICATIONS

Patent Abstracts of Japan for JP-A-2-068120 of Mar. 7, 1990.
Patent Abstracts of Japan for JP-A-4-363143 of Dec. 16, 1992.
Patent Abstracts of Japan for JP-A-55-031463 of Mar. 5, 1980.
Junko Oi et al., "Catalytic Decomposition of N2O over Rhodium–Loaded Metal Oxide," *Chemistry Letter 1995*, pp 453–454.
Freek Kapteijn, et al., "Review–Heterogeneous catalystic decomposition of nitrous oxide," *Applied Catalysis B: Environmental*, vol. 9, 1996, pp 25–64.
European Search Report, no date.

* cited by examiner

*Primary Examiner*—Steven Bos
(74) *Attorney, Agent, or Firm*—Sughrue Mion, PLLC

(57) ABSTRACT

The invention relates to a catalyst for decomposing nitrous oxide, which is [1] a catalyst comprising a support having supported thereon aluminum, magnesium and rhodium, [2] a catalyst comprising an alumina support having supported thereon magnesium and rhodium, [3] a catalyst comprising a support having supported thereon rhodium, the support comprising a spinel crystalline composite oxide formed by magnesium and at least a part of aluminum, [4] a catalyst comprising a support having supported thereon aluminum, rhodium and at least one metal selected from zinc, iron, manganese and nickel, [5] a catalyst comprising an alumina support having supported thereon rhodium and at least one metal selected from zinc, iron, manganese and nickel, or [6] a catalyst comprising a support having supported thereon rhodium, the support comprising a spinel crystalline composite oxide formed by at least a part of aluminum and the at least one metal selected from zinc, iron, manganese and nickel. The catalyst is not easily deteriorated in the activity due to moisture, favored with low-temperature decomposition activity and capable of reducing the amount of NOx generated to the allowable concentration or less. The invention also relates to a process for producing the catalyst and to a method for decomposing nitrous oxide.

45 Claims, No Drawings

CATALYST FOR DECOMPOSING NITROUS OXIDE, PROCESS FOR PRODUCING THE SAME AND METHOD FOR DECOMPOSING NITROUS OXIDE

CROSS REFERENCE TO THE RELATED APPLICATIONS

This is an application based on the prescription of 35 U.S.C. Section 111(a) with claiming the benefit of filing date of U.S. Provisional applications Ser. No. 60/241,748 filed Oct. 20, 2000 under the provision of 35 U.S.C. 111(b), pursuant to 35 U.S.C. Section 119(e)(1).

TECHNICAL FIELD

The present invention relates to a catalyst for use in decomposing and removing nitrous oxide ($N_2O$) contained in an exhaust gas discharged from factories or incineration facilities, or contained in an anesthetic gas discharged from an operating room, and also relates to a process for producing the catalyst and a method for decomposing nitrous oxide.

BACKGROUND OF THE INVENTION

Nitrogen oxides contained in exhaust gases discharged from factories, incineration facilities and the like are strictly regulated on the amount thereof discharged because these have an adverse effect on the human body and additionally work out to a substance causing acid rain. The nitrogen oxide generally called NOx which has been heretofore a target of the exhaust regulation, includes nitrogen monoxide (NO) and nitrogen dioxide ($NO_2$). For eliminating these nitrogen oxides, a catalytic reduction process using a reducing substance, or a ternary catalyst process is already put into practical use. In recent years, a process of allowing hydrocarbon to coexist in the presence of a zeolite or alumina catalyst has been proposed.

Out of nitrogen oxides, nitrous oxide has been heretofore not regulated on the exhaust value and released into atmosphere without passing through any decomposition treatment. However, at the International Global Warming Conference (COP3), nitrous oxide is, as well as nitrogen dioxide, methane and flon, particularly taken notice of as a global pollutant which brings about elevation of temperature due to greenhouse effect (the warming effect is as high as about 300 times the carbon dioxide) and the concern about the reduction in the release of nitrous oxide into atmosphere is increasingly growing.

Under these circumstances, means for removing nitrous oxide contained in exhaust gas is being aggressively studied and several methods have been proposed. For example, for removing nitrous oxide, a catalytic reduction process of reacting the exhaust gas with a catalyst in the presence together of a reducing gas (see, JP-A-2-068120 (the term "JP-A" as used herein means an "unexamined published Japanese patent application")) and a catalyst comprising zeolite-type support having supported thereon a transition metal (see, JP-A-4-363143) are known. These means have, however, a problem in that the treatment temperature is high or when moisture is present in the gas treated, the catalyst is deactivated.

In the medical field, contamination of an operating room by anesthetic gas and adverse effect on the health of workers have been taken as a matter of issue since 1960. It is known that as a result of long term inhalation of the anesthetic gas (a mixed gas containing nitrous oxide and a volatile anesthetic) leaked in the operating room, the health is disordered. In the U.S.A., the National Institute for Occupational Safety and Health (NIOSH) recommends to reduce, as a permissible standard, nitrous oxide ($N_2O$) to 25 ppm or less and a volatile anesthetic to 2 ppm in the case of a sole use and to 0.5 ppm or less in the case of a combination use with nitrous oxide. Accordingly, all anesthesia machines are obliged to be equipped with a waste anesthetic gas removing apparatus and at the present time, the environment in the operating room can reach the above-described levels.

The waste anesthetic gas removing apparatus is an apparatus for discharging the waste anesthetic gas outdoors from the exhalation of a patient by letting a compression air or the like to accompany the gas. However, the gas discharged from each operating room by the waste anesthetic gas removing apparatus is released into atmosphere without passing through any treatment at the present time. This technique may improve the environment within the operating room but is disadvantageous in view of the environmental issue of global warming from the reasons described above and the anesthetic gas is demanded to remove or be rendered harmless before the release into atmosphere.

Known examples of the catalyst capable of decomposing nitrous oxide in the waste anesthetic gas include:

(1) a catalyst mainly comprising at least one member selected from the group consisting of platinum, palladium, rhodium, iridium and ruthenium (see, JP-B-61-045486 (the term "JP-B" as used herein means an "examined Japanese patent publication"));

(2) a catalyst containing an iron family metal and an oxide of a rare earth element or a catalyst having further added thereto at least one platinum family (see, JP-B-61-45487);

(3) a catalyst mainly comprising a mixture of cupric oxide and chromium oxide or a catalyst having further added thereto at least one member selected from the group consisting of ferric oxide, nickel oxide, cobalt oxide and manganese dioxide (see, U.S. Pat. No. 4,259,303); and (4) a catalyst mainly comprising at least one of ferric oxide and chromium oxide (see, U.S. Pat. No. 4,259,303).

However, according to the process for decomposing nitrous oxide using the catalyst described in (2), (3) and (4) above, nitrous oxide in a high concentration may be decomposed but nitrogen monoxide (NO) and nitrogen dioxide ($NO_2$) (hereinafter sometimes collectively referred to as "NOx") as nitrogen oxides are produced in an amount of 5 to 32 ppm, thus, generation of NOx in excess of the allowable concentration of 3 ppm (TWA, time weighted average) for $NO_2$ remains as a problem. According to the process for decomposing nitrous oxide using the catalyst described in (1), when moisture in an amount of, for example, approximately from 1 to 3% is present in the reaction gas, the catalyst may decrease in the activity, and this remains as a problem to be solved.

The present invention has been made under these circumstances and the object of the present invention is to provide a catalyst for decomposing nitrous oxide, which is not easily deteriorated due to moisture, has low-temperature decomposition activity and can reduce the amount of NOx generated to lower than the allowable concentration. The object of the present invention includes providing a process for producing the catalyst and a method for decomposing nitrous oxide.

SUMMARY OF INVENTION

As a result of extensive investigations to solve the above-described problems, the present inventors have found that these problems can be solved by using any one of the following catalysts [1] to [6]:

[1] a catalyst comprising a support having supported thereon aluminum, magnesium and rhodium,

[2] a catalyst comprising an alumina support having supported thereon magnesium and rhodium,

[3] a catalyst comprising a support having supported thereon rhodium, the support comprising a spinel crystalline composite oxide formed by magnesium and at least a part of aluminum,

[4] a catalyst comprising a support having supported thereon aluminum, rhodium and at least one metal selected from the group consisting of zinc, iron, manganese and nickel,

[5] a catalyst comprising an alumina support having supported thereon rhodium and at least one metal selected from the group consisting of zinc, iron, manganese and nickel, and

[6] a catalyst comprising a support having supported thereon rhodium, the support comprising a spinel crystalline composite oxide formed by at least a part of aluminum and the at least one metal selected from the group consisting of zinc, iron, manganese and nickel. The present invention has been accomplished based on this finding. The present invention relates to the following matters [1] to [73].

[1] A catalyst for decomposing nitrous oxide, comprising a support having supported thereon aluminum, magnesium and rhodium.

[2] The catalyst for decomposing nitrous oxide as described in [1], wherein the support is at least one support selected from the group consisting of alumina, silica, zirconia, ceria, titania and tin oxide.

[3] A catalyst for decomposing nitrous oxide, comprising an alumina support having supported thereon magnesium and rhodium.

[4] The catalyst for decomposing nitrous oxide as described in [1] or [3], wherein aluminum is contained in an atomic ratio of 2 or more to magnesium.

[5] The catalyst for decomposing nitrous oxide as described in [1] or [3], wherein at least a part of aluminum forms a spinel crystalline composite oxide with magnesium.

[6] The catalyst for decomposing nitrous oxide as described in [1] or [3], wherein magnesium is contained in an amount of 0.1 to 20.0% by mass based on the catalyst as a whole.

[7] The catalyst for decomposing nitrous oxide as described in [1] or [3], wherein rhodium is contained in an amount of 0.05 to 10% by mass based on the catalyst as a whole.

[8] A catalyst for decomposing nitrous oxide, comprising a support having supported thereon rhodium, said support comprising a spinel crystalline composite oxide formed by magnesium and at least a part of aluminum.

[9] The catalyst for decomposing nitrous oxide as described in [8], wherein aluminum is contained in an atomic ratio of 2 or more to magnesium.

[10] The catalyst for decomposing nitrous oxide as described in [8], wherein magnesium is contained in an amount of 0.1 to 20.0% by mass based on the catalyst as a whole.

[11] The catalyst for decomposing nitrous oxide as described in [8], wherein rhodium is contained in an amount of 0.05 to 10% by mass based on the catalyst as a whole.

[12] A catalyst for decomposing nitrous oxide, comprising a support having supported thereon aluminum, rhodium and at least one metal selected from the group consisting of zinc, iron, manganese and nickel.

[13] The catalyst for decomposing nitrous oxide as described in [12], wherein the support is at least one support selected from the group consisting of alumina, zirconia, ceria, titania and tin oxide.

[14] A catalyst for decomposing nitrous oxide, comprising an alumina support having supported thereon rhodium and at least one metal selected from the group consisting of zinc, iron, manganese and nickel.

[15] The catalyst for decomposing nitrous oxide as described in [12] or [14], wherein aluminum is contained in an atomic ratio of 2 or more to the at least one metal selected from the group consisting of zinc, iron, manganese and nickel.

[16] The catalyst for decomposing nitrous oxide as described in [12] or [14], wherein at least a part of aluminum forms a spinel crystalline composite oxide with the at least one metal selected from the group consisting of zinc, iron, manganese and nickel.

[17] The catalyst for decomposing nitrous oxide as described in [12] or [14], wherein the at least one metal selected from the group consisting of zinc, iron, manganese and nickel is contained in an amount of 0.1 to 40.0% by mass based on the catalyst as a whole.

[18] The catalyst for decomposing nitrous oxide as described in [12] or [14], wherein rhodium is contained in an amount of 0.05 to 10% by mass based on the catalyst as a whole.

[19] A catalyst for decomposing nitrous oxide, comprising a support having supported thereon rhodium, said support comprising a spinel crystalline composite oxide formed by at least a part of aluminum and at least one metal selected from the group consisting of zinc, iron, manganese and nickel.

[20] The catalyst for decomposing nitrous oxide as described in [19], wherein aluminum is contained in an atomic ratio of 2 or more to the at least one metal selected from the group consisting of zinc, iron, manganese and nickel.

[21] The catalyst for decomposing nitrous oxide as described in [19], wherein the at least one metal selected from the group consisting of zinc, iron, manganese and nickel is contained in an amount of 0.1 to 40.0% by mass based on the catalyst as a whole.

[22] The catalyst for decomposing nitrous oxide as described in [19], wherein rhodium is contained in an amount of 0.05 to 10% by mass based on the catalyst as a whole.

[23] The catalyst for decomposing nitrous oxide as described in [1], [3], [8], [12], [14] or [19], wherein the amount of NOx generated at the decomposition of nitrous oxide is 1 ppm or less.

[24] A process for producing a catalyst for decomposing nitrous oxide described in [1], comprising the following three steps:

(1) a step of loading aluminum and magnesium on a support;

(2) a step of calcining the support having supported thereon aluminum and magnesium obtained in the step (1); and (3) a step of loading rhodium on the calcined support obtained in the step (2) and then calcining the support.

[25] A process for producing acatalyst for decomposing nitrous oxide described in [8], comprising the following three steps:

(1) a step of loading aluminum and magnesium on a support;
(2) a step of calcining the support having supported thereon aluminum and magnesium obtained in the step (1); and
(3) a step of loading rhodium on the calcined support obtained in the step (2) and then calcining the support.

[26] The process for producing a catalyst for decomposing nitrous oxide as described in [24] or [25], wherein the support is at least one support selected from the group consisting of alumina, silica, zirconia, ceria, titania and tin oxide.

[27] The process for producing a catalyst for decomposing nitrous oxide as described in [24] or [25], wherein aluminum is supported in an atomic ratio of 2 or more to magnesium.

[28] The process for producing a catalyst for decomposing nitrous oxide as described in [24] or [25], wherein the amount of magnesium supported is from 0.1 to 20.0% by mass based on the catalyst as a whole.

[29] The process for producing a catalyst for decomposing nitrous oxide as described in [24] or [25], wherein the amount of rhodium supported is from 0.05 to 10% by mass based on the catalyst as a whole.

[30] A process for producing a catalyst for decomposing nitrous oxide described in [12], comprising the following three steps:
(1) a step of loading aluminum and at least one metal selected from the group consisting of zinc, iron, manganese and nickel on a support;
(2) a step of calcining the support having supported thereon aluminum and at least one metal selected from the group consisting of zinc, iron, manganese and nickel, obtained in the step (1); and
(3) a step of loading rhodium on the calcined support obtained in the step (2) and then calcining the support.

[31] A process for producing a catalyst for decomposing nitrous oxide described in [19], comprising the following three steps:
(1) a step of loading aluminum and at least one metal selected from the group consisting of zinc, iron, manganese and nickel on a support;
(2) a step of calcining the support having supported thereon aluminum and at least one metal selected from the group consisting of zinc, iron, manganese and nickel, obtained in the step (1); and
(3) a step of loading rhodium on the calcined support obtained in the step (2) and then calcining the support.

[32] The process for producing a catalyst for decomposing nitrous oxide as described in [30] or [31], wherein the support is at least one support selected from the group consisting of alumina, zirconia, ceria, titania and tin oxide.

[33] The process for producing a catalyst for decomposing nitrous oxide as described in [30] or [31], wherein aluminum is supported in an atomic ratio of 2 or more to the at least one metal selected from the group consisting of zinc, iron, manganese and nickel.

[34] The process for producing a catalyst for decomposing nitrous oxide as described in [30] or [31], wherein the amount supported of the at least one metal selected from the group consisting of zinc, iron, manganese and nickel is from 0.1 to 40.0% by mass based on the catalyst as a whole.

[35] The process for producing a catalyst for decomposing nitrous oxide as described in [30] or [31], wherein the amount of rhodium supported is from 0.05 to 10% by mass based on the catalyst as a whole.

[36] A process for producing a catalyst for decomposing nitrous oxide described in [3], comprising the following three steps:
(1) a step of loading magnesium on an alumina support;
(2) a step of calcining the support having supported thereon magnesium obtained in the step (1);
(3) a step of loading rhodium on the calcined support obtained in the step (2) and then calcining the support.

[37] A process for producing a catalyst for decomposing nitrous oxide described in [8], comprising the following three steps:
(1) a step of loading magnesium on an alumina support;
(2) a step of calcining the support having supported thereon magnesium obtained in the step (1);
(3) a step of loading rhodium on the calcined support obtained in the step (2) and then calcining the support.

[38] The process for producing a catalyst for decomposing nitrous oxide as described in [36] or [37], wherein the amount of magnesium supported is ½ or less in terms of the atomic ratio to aluminum.

[39] The process for producing a catalyst for decomposing nitrous oxide as described in [36] or [37], wherein the amount of magnesium supported is from 0.1 to 20.0% by mass based on the catalyst as a whole.

[40] The process for producing a catalyst for decomposing nitrous oxide as described in [36] or [37], wherein the amount of rhodium supported is from 0.05 to 10% by mass based on the catalyst as a whole.

[41] A process for producing a catalyst for decomposing nitrous oxide described in [14], comprising the following three steps:
(1) a step of loading at least one metal selected from the group consisting of zinc, iron, manganese and nickel on an alumina support;
(2) a step of calcining the support having supported thereon at least one metal selected from the group consisting of zinc, iron, manganese and nickel, obtained in the step (1);
(3) a step of loading rhodium on the calcined support obtained in the step (2) and then calcining the support.

[42] A process for producing acatalyst for decomposing nitrous oxide described in [19], comprising the following three steps:
(1) a step of loading at least one metal selected from the group consisting of zinc, iron, manganese and nickel on an alumina support;
(2) a step of calcining the support having supported thereon at least one metal selected from the group consisting of zinc, iron, manganese and nickel, obtained in the step (1);
(3) a step of loading rhodium on the calcined support obtained in the step (2) and then calcining the support.

[43] The process for producing a catalyst for decomposing nitrous oxide as described in [41] or [42], wherein the amount supported of at least one metal selected from the group consisting of zinc, iron, manganese and nickel is ½ or less in terms of the atomic ratio to aluminum.

[44] The process for producing a catalyst for decomposing nitrous oxide as described in [41] or [42], wherein the amount supported of the at least one metal selected from the group consisting of zinc, iron, manganese and nickel is from 0.1 to 40.0% by mass based on the catalyst as a whole.

[45] The process for producing a catalyst for decomposing nitrous oxide as described in [41] or [42], wherein the amount of rhodium supported is from 0.05 to 10% by mass based on the catalyst as a whole.

[46] A process for producing a catalyst for decomposing nitrous oxide described in [8], comprising the following three steps:

(1) a step of neutralization-precipitating an aluminum salt and a magnesium salt;

(2) a step of calcining the precipitate obtained in the step (1); and (3) a step of loading rhodium on the calcined material obtained in the step (2) and then calcining the material.

[47] The process for producing a catalyst for decomposing nitrous oxide as described in [46], wherein aluminum is contained in an atomic ratio of 2 or more to magnesium.

[48] The process for producing a catalyst for decomposing nitrous oxide as described in [46], wherein magnesium is contained in an amount of 0.1 to 20.0% by mass based on the catalyst as a whole.

[49] The process for producing a catalyst for decomposing nitrous oxide as described in [46], wherein the amount of rhodium supported is from 0.05 to 10% by mass based on the catalyst as a whole.

[50] A process for producing a catalyst for decomposing nitrous oxide described in [19], comprising the following three steps:

(1) a step of neutralization-precipitating an aluminum salt and at least one metal salt selected from the group consisting of zinc, iron, manganese and nickel;

(2) a step of calcining the precipitate obtained in the step (1); and (3) a step of loading rhodium on the calcined material obtained in the step (2) and then calcining the material.

[51] The process for producing a catalyst for decomposing nitrous oxide as described in [50], wherein aluminum is contained in an atomic ratio of 2 or more to the at least one metal selected from the group consisting of zinc, iron, manganese and nickel.

[52] The process for producing a catalyst for decomposing nitrous oxide as described in [50], wherein at least one metal selected from the group consisting of zinc, iron, manganese and nickel is contained in an amount of 0.1 to 40.0% by mass based on the catalyst as a whole.

[53] The process for producing a catalyst for decomposing nitrous oxide as described in [50], wherein the amount of rhodium supported is from 0.05 to 10% by mass based on the catalyst as a whole.

[54] A process for producing a catalyst for decomposing nitrous oxide described in [3], comprising the following three steps:

(1) a step of mixing alumina and/or aluminum hydroxide with magnesium oxide, magnesium hydroxide and/or magnesium salt;

(2) a step of calcining the mixture obtained in the step (1); and (3) a step of loading rhodium on the calcined material obtained in the step (2) and then calcining the material.

[55] A process for producing a catalyst for decomposing nitrous oxide described in [8], comprising the following three steps:

(1) a step of mixing alumina and/or aluminum hydroxide with magnesium oxide, magnesium hydroxide and/or magnesium salt;

(2) a step of calcining the mixture obtained in the step (1); and (3) a step of loading rhodium on the calcined material obtained in the step (2) and then calcining the material.

[56] The process for producing a catalyst for decomposing nitrous oxide as described in [54] or [55], wherein aluminum is contained in an atomic ratio of 2 or more to magnesium.

[57] The process for producing a catalyst for decomposing nitrous oxide as described in [54] or [55], wherein magnesium is contained in an amount of 0.1 to 20.0% by mass based on the catalyst as a whole.

[58] The process for producing a catalyst for decomposing nitrous oxide as described in [54] or [55], wherein the amount of rhodium supported is from 0.05 to 10% by mass based on the catalyst as a whole.

[59] A process for producing a catalyst for decomposing nitrous oxide described in [14], comprising the following three steps:

(1) a step of mixing alumina and/or aluminum hydroxide with an oxide, a hydroxide and/or a metal salt of at least one metal selected from the group consisting of zinc, iron, manganese and nickel;

(2) a step of calcining the mixture obtained in the step (1); and (3) a step of loading rhodium on the calcined material obtained in the step (2) and then calcining the material.

[60] A process for producing a catalyst for decomposing nitrous oxide described in [19], comprising the following three steps:

(1) a step of mixing alumina and/or aluminum hydroxide with an oxide, a hydroxide and/or a metal salt of at least one metal selected from the group consisting of zinc, iron, manganese and nickel;

(2) a step of calcining the mixture obtained in the step (1); and (3) a step of loading rhodium on the calcined material obtained in the step (2) and then calcining the material.

[61] The process for producing a catalyst for decomposing nitrous oxide as described in [59] or [60] wherein aluminum is contained in an atomic ratio of 2 or more to the at least one metal selected from the group consisting of zinc, iron, manganese and nickel.

[62] The process for producing a catalyst for decomposing nitrous oxide as described in [59] or [60], wherein the at least one metal selected from the group consisting of zinc, iron, manganese and nickel is contained in an amount of 0.1 to 40.0% by mass based on the catalyst as a whole.

[63] The process for producing a catalyst for decomposing nitrous oxide as described in [59] or [60], wherein the amount of rhodium supported is from 0.05 to 10% by mass based on the catalyst as a whole.

[64] The process for producing a catalyst for decomposing nitrous oxide as described in [24], [25], [30], [31], [36], [37], [41], [42], [46], [50], [54], [55], [59] or [60], wherein the calcining temperature in the step (2) is from 400 to 900° C.

[65] The process for producing a catalyst for decomposing nitrous oxide as described in [24], [25], [30], [31], [36], [37], [41], [42], [46], [50], [54], [55], [59] or [60], wherein the calcining temperature in the step (3) is from 200 to 500° C.

[66] The process for producing a catalyst for decomposing nitrous oxide as described in [24], [25], [30], [31], [36], [37], [41], [42], [46], [50], [54], [55], [59] or [60], wherein a reduction treatment step is performed after the step (3).

[67] The process for producing a catalyst for decomposing nitrous oxide as described in [66], wherein the reduction treatment step is hydrogen reduction treatment step.

[68] The process for producing a catalyst for decomposing nitrous oxide as described in [67], wherein the hydrogen reduction treatment temperature is from 400 to 900° C.

[69] A method for decomposing nitrous oxide, comprising contacting the catalyst for decomposing nitrous oxide described in any one of [1] to [23] with a gas containing nitrous oxide.

[70] The method for decomposing nitrous oxide as described in [69], wherein the contacting temperature is from 200 to 600° C.

[71] The method for decomposing nitrous oxide as described in [69], wherein the gas decomposed is nitrous oxide contained in an anesthetic gas and the concentration of nitrous oxide is 70% or less.

[72] The method for decomposing nitrous oxide as described in [69], wherein the gas decomposed is nitrous oxide contained in an exhaust gas discharged from factories or incineration facilities and the concentration of nitrous oxide is 10% or less.

[73] The method for decomposing nitrous oxide as described in [69], wherein the amount of NOx generated at the decomposition of nitrous oxide is 1 ppm or less.

DETAILED DESCRIPTION OF INVENTION

The present invention is described in detail below.

The concentration of nitrous oxide contained in an exhaust gas discharged from factories or incineration facilities is 10% or less. On the other hand, the waste anesthetic gas is somewhat diluted with compressed air by the waste anesthetic gas removing apparatus, nevertheless, the concentration of nitrous oxide contained in a waste anesthetic gas discharged from an operating room is very high and 70% or less. The catalyst for decomposing nitrous oxide of the present invention is a catalyst which can cope with the decomposition of nitrous oxide having from low to high concentration.

The catalyst for decomposing nitrous oxide of the present invention is advantageous in that the decomposition treatment can be performed at a relatively low temperature, the deterioration in activity hardly occurs even when moisture is present together, the amount of NOx generated can be controlled to lower than the allowable concentration, and the amount of NOx generated can be reduced to from about $1/10$ to $1/100$ of that in a treatment using conventional decomposition catalysts.

The catalyst for decomposing nitrous oxide of the present invention can be at least one catalyst selected from the following catalysts [1] to [3] containing three kinds of metals, namely, aluminum, magnesium and rhodium, as essential components:

[1] a catalyst comprising a support having supported thereon aluminum, magnesium and rhodium,

[2] a catalyst comprising an alumina support having supported thereon magnesium and rhodium, and

[3] a catalyst comprising a support having supported thereon rhodium, the support comprising a spinel crystalline composite oxide formed by magnesium and at least a part of aluminum, and the following catalysts [4] to [6] containing two kinds of metals, namely, aluminum and rhodium, and at least one metal selected from the group consisting of zinc, iron, manganese and nickel, as essential components:

[4] a catalyst comprising a support having supported thereon aluminum, rhodium and at least one metal selected from the group consisting of zinc, iron, manganese and nickel,

[5] a catalyst comprising an alumina support having supported thereon rhodium and at least one metal selected from the group consisting of zinc, iron, manganese and nickel, and

[6] a catalyst comprising a support having supported thereon rhodium, the support comprising a spinel crystalline composite oxide formed by at least a part of aluminum and the at least one metal selected from the group consisting of zinc, iron, manganese and nickel.

For the support used in the catalyst [1], a support selected from the group consisting of alumina, silica, zirconia, ceria, titania and tin oxide can be used and for the support used in the catalyst [4], a support selected from the group consisting of alumina, zirconia, ceria, titanium and tin oxide can be used. In each case, the support which can be used has a surface area of approximately from 30 to 300 $m^2/g$. The shape thereof is not particularly limited, however, according to the reactor or reaction form, an appropriate shape can be selected, such as particle, powder and honeycomb.

In the catalyst [1], the aluminum and magnesium supported on the support are preferably contained such that aluminum is in an atomic ratio of 2 or more to magnesium. The magnesium is preferably contained, in terms of the metal atom, in an amount of 0.1 to 20.0% by mass based on the catalyst as a whole.

At least a part of aluminum preferably forms a spinel crystalline composite oxide with magnesium. The spinel crystalline composite oxide can be produced, for example, by calcining a support having supported thereon aluminum and magnesium. The spinel structure is a structure observed in oxides having a chemical formula of $XY_2O_4$ and belongs to a cubic system. Al and Mg are known to form a spinel structure of $MgAl_2O_4$. Although the reasons are not clearly known, it is presumed that in the catalyst for decomposing nitrous oxide of the present invention, at least a part of aluminum forms a spinel crystalline composite oxide with magnesium and by virtue of this structure, the ability of decomposing nitrous oxide can be improved and at the same time, the effect of reducing the amount of NOx generated can be brought out.

In the catalyst [4], the aluminum and at least one metal selected from the group consisting of zinc, iron, manganese and nickel, supported on the support are preferably contained such that aluminum is in an atomic ratio of 2 or more to the at least one metal selected from the group consisting of zinc, iron, manganese and nickel. Furthermore, the at least one metal selected from the group consisting of zinc, iron, manganese and nickel is preferably contained in an amount of, in terms of the metal atom, from 0.1 to 40.0% by mass based on the catalyst as a whole.

At least a part of aluminum preferably forms a spinel crystalline composite oxide with the at least one metal selected from the group consisting of zinc, iron, manganese and nickel. The spinel crystalline composite oxide can be produced by calcining a support having supported thereon aluminum and at least one metal selected from the group consisting of zinc, iron, manganese and nickel. Aluminum is known to form a spinel structure of $MAl_2O_4$ (M=Zn, Fe, Mn, Ni) with zinc, iron, manganese or nickel. Although the reasons are not clearly known, it is presumed that in the catalyst for decomposing nitrous oxide of the present invention, at least a part of aluminum forms a spinel crystalline composite oxide with at least one metal selected from the group consisting of zinc, iron, manganese and nickel and by virtue of this structure, the ability of decomposing nitrous oxide can be improved and at the same time, the effect of reducing the amount of NOx generated can be brought out.

The support for use in the catalyst [2] is alumina and the alumina is not particularly limited, however, the alumina which can be used has a surface area of approximately 50 to 300 $m^2/g$. The magnesium supported on alumina is preferably contained such that aluminum is in an atomic ratio of 2 or more to magnesium. Also, the magnesium is preferably contained in terms of the metal atom, in an amount of 0.1 to 20.0% by mass based on the catalyst as a whole. Furthermore, at least a part of aluminum preferably forms a spinel crystalline composite oxide with magnesium.

The support for use in the catalyst [5] is alumina and the alumina is not particularly limited, however, the alumina which can be used has a surface area of approximately 50 to 300 m$^2$/g. The at least one metal selected from the group consisting of zinc, iron, manganese and nickel, which is supported on alumina, is preferably contained such that aluminum is in an atomic ratio of 2 or more to the at least one metal selected from the group consisting of zinc, iron, manganese and nickel. Also, the at least one metal selected from the group consisting of zinc, iron, manganese and nickel is preferably contained, in terms of the metal atom, in an amount of 0.1 to 40.0% by mass based on the catalyst as a whole. Furthermore, at least a part of aluminum preferably forms a spinel crystalline composite oxide with the at least one metal selected from the group consisting of zinc, iron, manganese and nickel.

The catalyst [3] uses a support in which a spinel crystalline composite oxide is formed by magnesium and at least a part of aluminum. In the catalyst [3], aluminum and magnesium are preferably contained such that aluminum is in an atomic ratio of 2 or more to magnesium. Also, the magnesium is preferably contained, in terms of the metal atom, in an amount of 0.1 to 20.0% by mass based on the catalyst as a whole.

The catalyst [6] uses a support in which a spinel crystalline composite oxide is formed by at least a part of aluminum and the at least one metal selected from the group consisting of zinc, iron, manganese and nickel. In the catalyst [6], aluminum and the at least one metal selected from the group consisting of zinc, iron, manganese and nickel are preferably contained such that aluminum is in an atomic ratio of 2 or more to the at least one metal selected from the group consisting of zinc, iron, manganese and nickel. Also, the at least one metal selected from the group consisting of zinc, iron, manganese and nickel is preferably contained, in terms of the metal atom, in an amount of 0.1 to 40.0% by mass based on the catalyst as a whole.

In any of the catalysts [1] to [6] for decomposing nitrous oxide of the present invention, rhodium is preferably contained in the catalyst, in terms of the metal atom, in an amount of 0.05 to 10% by mass, more preferably from 0.1 to 6.0% by mass, based on the catalyst as a whole. By increasing the amount of rhodium supported, the catalyst activity at low temperatures may be improved, however, loading in excess of 10% by mass is not preferred in view of the catalyst cost and if the amount supported is less than 0.05% by mass, sufficiently high activity of decomposing nitrous oxide cannot be obtained.

The process for producing the catalyst for decomposing nitrous oxide of the present invention is described below.

The catalyst for decomposing nitrous oxide of the present invention can be produced by various methods such as (1) impregnation method, (2) co-precipitation method and (3) kneading method. The process for producing the catalyst for decomposing nitrous oxide of the present invention is described below by referring to these three methods.

(1) Production Process of Catalyst Using Impregnation Method

By using the impregnation method, the above-described catalysts [1] to [6] can be produced.

In the case of producing the catalyst [1], a support selected from the group consisting of alumina, silica, zirconia, ceria, titania and tin oxide is impregnated with inorganic acid salts (e.g., nitrate, hydrochloride, sulfate) or organic acid salts (e.g., oxalate, acetate) of aluminum and magnesium. In the case of producing the catalyst [4], a support selected from the group consisting of alumina, zirconia, ceria, titania and tin oxide is impregnated with inorganic acid salts (e.g., nitrate, hydrochloride, sulfate) or organic acid salts (e.g., oxalate, acetate) of aluminum and at least one metal selected from the group consisting of zinc, iron, manganese and nickel.

In the case of producing the catalyst [2], an alumina support is impregnated with an inorganic acid salt (e.g., nitrate, hydrochloride, sulfate) or organic acid salt (e.g., oxalate, acetate) of magnesium. In the case of producing the catalyst [5], an alumina support is impregnated with an inorganic acid salt (e.g., nitrate, hydrochloride, sulfate) or organic acid salt (e.g., oxalate, acetate) of at least one metal selected from the group consisting of zinc, iron, manganese and nickel. The aluminum salt, the magnesium salt and the salt of at least one metal selected from the group consisting of zinc, iron, manganese and nickel each is preferably nitrate.

In the case of producing the catalyst [1], aluminum and magnesium are preferably supported on a support such that aluminum is in an atomic ratio of 2 or more to magnesium and also such that the amount of magnesium supported is from 0.1 to 20.0% by mass based on the catalyst as a whole. In the case of producing the catalyst [4], aluminum and the at least one metal selected from the group consisting of zinc, iron, manganese and nickel are preferably supported on a support such that aluminum is in an atomic ratio of 2 or more to the at least one metal selected from the group consisting of zinc, iron, manganese and nickel and also such that the amount supported of the at least one metal selected from the group consisting of zinc, iron, manganese and nickel is from 0.1 to 40.0% by mass based on the catalyst as a whole.

In the case of producing the catalyst [2], magnesium is preferably supported such that magnesium is in an atomic ratio of ½ or less to aluminum and also such that the amount of magnesium supported is from 0.1 to 20.0% by mass based on the catalyst as a whole. In the case of producing the catalyst [5], the at least one metal selected from the group consisting of zinc, iron, manganese and nickel is preferably supported on a support such that the at least one metal selected from the group consisting of zinc, iron, manganese and nickel is in an atomic ratio of ½ or less to aluminum and also such that the amount supported of the at least one metal selected from the group consisting of zinc, iron, manganese and nickel is from 0.1 to 40.0% by mass based on the catalyst as a whole.

After the objective salt is supported on a support, the support is dried and calcined, as a result, a support comprising aluminum and magnesium with at least a part of aluminum forming a spinel crystalline composite oxide with magnesium can be obtained. This support is used as the support of the catalyst [1]. In the same manner, a support comprising aluminum and at least one metal selected from the group consisting of zinc, iron, manganese and nickel with at least a part of aluminum forming a spinel crystalline composite oxide with the at least one metal selected from the group consisting of zinc, iron, manganese and nickel. This support is used as the support of the catalyst [4]. For example, the temperature at the drying after aluminum salt and magnesium salt are impregnated in the catalyst [1], and the temperature at the drying after aluminum salt and a salt of at least one metal selected from the group consisting of zinc, iron, manganese and nickel are impregnated are not particularly limited but each temperature is preferably in the range from 80 to 150° C., more preferably from 100 to 130° C. Also, the drying atmosphere is not particularly limited and nitrogen or air may be used. The drying time is not particularly limited but, in the case of using the impregnation method, the drying time is usually from about 2 to 4 hours.

The calcination treatment of the support after impregnation and then drying can be performed at a temperature in the range from 400 to 900° C., preferably from 500 to 700° C. If the calcination temperature is less than 400° C., the crystallization does not proceed sufficiently, whereas if it exceeds 900° C., reduction in the specific surface area of the support is disadvantageously incurred. The calcination time is not particularly limited but is suitably on the order of 1 to 10 hours, preferably from 2 to 4 hours. The calcination temperature may be changed stepwise. A calcination treatment over a long period of time is economically disadvantageous because the effect is saturated, whereas a calcination treatment in a short time may sometimes fail in yielding a sufficiently high effect. The calcination can be performed using a kiln or a muffle furnace and at this time, the flowing gas which can be used may be either nitrogen or air.

On the support obtained by the above-described calcination, a rhodium salt is loaded. The rhodium salt which can be used includes an inorganic acid salt (e.g., nitrate, hydrochloride, sulfate) or an organic acid salt (e.g., oxalate, acetate). Among these, nitrate is preferred. In the step of loading a rhodium salt, for example, when a catalyst containing three kinds of metals, namely, aluminum, magnesium and rhodium, as essential components is produced, the rhodium salt is preferably supported on a support obtained by the above-described method, in which at least a part of aluminum forms a spinel crystalline composite oxide with magnesium. However, the step of loading rhodium salt may be performed simultaneously with the step of impregnating and loading aluminum and magnesium on a support or with the step of impregnating and loading magnesium on an alumina support. The amount of rhodium supported is preferably controlled to 0.05 to 10% by mass based on the catalyst as a whole.

Similarly, in the step of loading a rhodium salt, for example, when a catalyst containing two kinds of metals, namely, aluminum and rhodium, and at least one metal selected from the group consisting of zinc, iron, manganese and nickel, as essential components is produced, the rhodium salt is preferably supported on a support obtained by the above-described method, in which at least a part of aluminum forms a spinel crystalline composite oxide together with the at least one metal selected from the group consisting of zinc, iron, manganese and nickel. However, the step of loading rhodium salt may be performed simultaneously with the step of impregnating and loading aluminum and at least one metal selected from the group consisting of zinc, iron, manganese and nickel on a support or with the step of impregnating and loading at least one metal selected from the group consisting of zinc, iron, manganese and nickel on an alumina support. The amount of rhodium supported is preferably controlled to 0.05 to 10% by mass based on the catalyst as a whole.

Here, when a spinel crystalline composite oxide is previously formed by magnesium and at least a part of aluminum in the support used, the catalyst [3] can be produced by loading a rhodium salt on this support in the same manner as above. Furthermore, when a spinel crystalline composite oxide is previously formed by at least a part of aluminum and at least one metal selected from the group consisting of zinc, iron, manganese and nickel in the support used, the catalyst [6] can be produced by loading a rhodium salt on this support.

Subsequently, this catalyst precursor having supported thereon rhodium is dried under the same drying conditions as above and the dried catalyst precursor is calcined. The calcination temperature here is preferably from 200 to 500° C., more preferably from 300 to 400° C. The catalyst obtained after the calcination may be used as a catalyst for decomposing nitrous oxide but is preferably subjected to a reduction treatment. By performing the reduction treatment, a rhodium-containing catalyst having higher activity can be obtained. The reduction treatment may be performed by, for example, (1) a method where the catalyst precursor is reduced with hydrazine, again dried and then calcined or (2) a method of performing hydrogen reduction. Of these, the method of performing hydrogen reduction is preferred. In the case of using the hydrogen reduction method, the reduction temperature is preferably from 200 to 500° C., more preferably from 300 to 400° C. The reduction time is not particularly limited but is suitably on the order of 1 to 10 hours, preferably on the order of 2 to 4 hours. The reduction treatment may be performed without passing through the calcination treatment and also in this case, a rhodium-containing catalyst having high activity can be obtained. In the case of producing a catalyst by performing the reduction treatment without passing through calcination, a hydrogen reduction method at a temperature of 200 to 500° C. is preferred.

(2) Production Process of Catalyst Using Co-Precipitation Method

By using the co-precipitation method, the catalysts [3] and [6] can be produced. According to the process for producing the catalyst [3] using the co-precipitation method, for example, aqueous ammonia is added dropwise to an aqueous solution containing nitrates of aluminum and magnesium to cause neutralization precipitation, the precipitate is, if desired, ripened by allowing it to stand, then filtrated and washed with water, and after confirming thorough washing by the electric conductivity of the cleaning water, dried for about 10 to 12 hours under the same condition as in the impregnation method. The obtained dry material is pulverized and graded to obtain the shaped material. The shaped material is calcined in an atmosphere of nitrogen or air under the same conditions as in the impregnation method, as a result, a support in which a spinel crystalline composite oxide is formed by at least a part of aluminum together with magnesium, is obtained.

The amounts of aluminum and magnesium are preferably controlled such that aluminum is in an atomic ratio of 2 or more to magnesium, and the magnesium is preferably contained, in terms of metal atom, in an amount of 0.1 to 20.0% by mass based on the catalyst as a whole. On the thus-obtained support in which at least a part of aluminum forms a spinel crystalline composite oxide together with magnesium, a rhodium salt is loaded. The method therefor, the amount supported and the treatment subsequent thereto may be the same as in the above-described impregnation method.

According to the process for producing the catalyst [6] using the co-precipitation method, for example, aqueous ammonia is added dropwise to an aqueous solution containing a nitrate of aluminum and a nitrate of at least one metal selected from the group consisting of zinc, iron, manganese and nickel to cause neutralization precipitation, the precipitate is, if desired, ripened by allowing it to stand, then filtrated and washed with water, and after confirming thorough washing by the electric conductivity of the cleaning water, dried for about 10 to 12 hours under the same condition as in the impregnation method. The obtained dry material is pulverized and graded to obtain the shaped material. The shaped material is calcined in an atmosphere of nitrogen or air under the same conditions as in the impregnation method, as a result, a support in which a spinel crystalline composite oxide is formed by at least a part of aluminum and the at least one metal selected from the group consisting of zinc, iron, manganese and nickel, is obtained.

The amounts of aluminum and the at least one metal selected from the group consisting of zinc, iron, manganese and nickel are preferably controlled such that aluminum is in an atomic ratio of 2 or more to the at least one metal selected from the group consisting of zinc, iron, manganese and nickel. The at least one metal selected from the group consisting of zinc, iron, manganese and nickel is preferably contained, in terms of metal atom, in an amount of 0.1 to 40.0% by mass based on the catalyst as a whole. On the thus-obtained support in which at least a part of aluminum forms a spinel crystalline composite oxide together with the at least one metal selected from the group consisting of zinc, iron, manganese and nickel, a rhodium salt is loaded. The method therefor, the amount supported and the treatment subsequent thereto may be the same as in the above-described impregnation method.

(3) Production Process of Catalyst Using Kneading Method

By using a kneading method, the catalysts [3] and [6] can be produced.

According to the process for producing the catalyst [3] using the kneading method, for example, alumina and/or aluminum hydroxide are mechanically mixed with magnesium oxide, magnesium hydroxide and/or magnesium salt while adding, for example, water, if desired, and the obtained mixture is dried and calcined under the same conditions as in the impregnation method, whereby the above-described spinel crystalline composite oxide can be obtained. The amounts of aluminum and magnesium are preferably controlled such that aluminum is in an atomic ratio of 2 or more to magnesium, and the magnesium is preferably contained, in terms of metal atom, in an amount of 0.1 to 20.0% by mass based on the catalyst as a whole.

On the thus-obtained calcined product in which at least a part of aluminum forms a spinel crystalline composite oxide together with magnesium, a rhodium salt is loaded. The method therefor, the amount supported and the treatment subsequent thereto may be the same as in the impregnation method described above. The rhodium salt may also be added in advance at the time when alumina and the like are mechanically mixed.

According to the process for producing the catalyst [6] using the kneading method, for example, alumina and/or aluminum hydroxide are mechanically mixed with an oxide, hydroxide and/or salt of at least one metal selected from the group consisting of zinc, iron, manganese and nickel while adding, for example, water, if desired, and the obtained mixture is dried and calcined under the same conditions as in the impregnation method, whereby the above-described spinel crystalline composite oxide can be obtained. The amounts of aluminum and the at least one metal selected from the group consisting of zinc, iron, manganese and nickel are preferably controlled such that aluminum is in an atomic ratio of 2 or more to the at least one metal selected from the group consisting of zinc, iron, manganese and nickel, and the at least one metal selected from the group consisting of zinc, iron, manganese and nickel is preferably contained, in terms of metal atom, in an amount of 0.1 to 40.0% by mass based on the catalyst as a whole.

On the thus-obtained calcined product in which at least a part of aluminum forms a spinel crystalline composite oxide together with the at least one metal selected from the group consisting of zinc, iron, manganese and nickel, a rhodium salt is loaded. The method therefor, the amount supported and the treatment subsequent thereto may be the same as in the impregnation method described above. The rhodium salt may also be added in advance at the time when alumina and the like are mechanically mixed.

The method for decomposing nitrous oxide using the decomposition catalyst of the present invention is described below.

In the case of performing the decomposition reaction of nitrous oxide using the decomposition catalyst of the present invention, the reaction may be performed by contacting the decomposition catalyst of the present invention with nitrous oxide in a gas phase at a temperature of 200 to 600° C., preferably from 300 to 500° C., more preferably from 350 to 450° C. If the temperature is less than 200° C., the decomposition of nitrous oxide does not proceed satisfactorily, whereas if it exceeds 600° C., the catalyst life is readily shortened and this is not preferred. The catalyst bed system is not particularly limited but in general, a fixed bed is preferably used.

Conventional catalysts using palladium are affected by moisture and decrease in the catalytic activity and even if the moisture is removed, the activity cannot be recovered. On the other hand, the decomposition catalyst of the present invention has properties such that the activity may decrease slightly due to the presence of moisture in a concentration of 1 to 3%, but when the moisture is removed, the original activity can be recovered.

The gas composition which can be decomposed using the decomposition catalyst of the present invention is described below. The concentration of nitrous oxide contained in an exhaust gas discharged from factories or incineration facilities is 10% or less and by using the decomposition catalyst of the present invention, nitrous oxide contained in the exhaust gas at a concentration of 1 ppm to 10% can be decomposed. The concentration of nitrous oxide discharged from an operating room by a waste anesthetic gas removing apparatus is very high and from 3 to 70%. In the case of decomposing nitrous oxide contained in an anesthetic gas, the reaction proceeds usually in the presence of oxygen in a concentration of 13 to 20% and the reaction conditions are severe to the decomposition catalyst. As long as heat can be gradually removed and the temperature can be satisfactorily controlled, the concentration of nitrous oxide subjected to the decomposition treatment may not be particularly limited, however, since the decomposition reaction of nitrous oxide into nitrogen and oxygen is an exothermic reaction, the concentration of nitrous oxide is suitably from 3 to 50%, preferably from 3 to 25%, more preferably from 3 to 10%.

The space velocity (SV) as the amount of gas fed per unit catalyst is suitably from 10 to 20,000 $Hr^{-1}$, preferably from 100 to 10,000 $Hr^{-1}$.

BEST MODE FOR CARRYING OUT THE INVENTION

The present invention is described in greater detail below by referring to the Catalyst Preparation Examples, Nitrous Oxide Decomposition Examples and Comparative Examples, however, the present invention should not be construed as being limited thereto.

EXAMPLE 1

Catalyst Preparation Example 1

In 4.12 g of distilled water, 0.052 g of magnesium nitrate (Mg (NO$_3$)$_2$.6H$_2$O) was dissolved. Thereto, 2.04 g of an alumina support was added, impregnated with the entire amount, and evaporation-dried to the bone in a hot bath at 90° C. The obtained support was dried in air at 120° C. for 12 hours, calcined at 400° C. for 3 hours in a nitrogen stream, and subsequently calcined in a muffle furnace at 650° C. for 3 hours in an air stream to obtain a magnesium-containing alumina support. With 2.08 g of distilled water, 1.30 g of a 21.4% rhodium nitrate solution (Rh(NO$_3$)$_3$ aq.) was mixed. Thereto, the magnesium-containing alumina support prepared above was added, impregnated with the whole amount and evaporation-dried to the bone in a hot bath at 90° C. The obtained catalyst precursor was dried in air at 120° C. for 12 hours and then subjected to hydrogen reduction at 400° C. for 3 hours to obtain a catalyst containing MgAl$_2$O$_4$ where 5% by mass of Rh and 0.2% by mass of Mg were supported on alumina.

EXAMPLE 2

Catalyst Preparation Example 2

In 300 g of distilled water, 21.40 g of magnesium nitrate (Mg(NO$_3$)$_2$.6H$_2$O ) and 62.52 g of aluminum nitrate (Al(NO$_3$)$_2$.9H$_2$O ) were dissolved. Thereto, aqueous ammonia was added while stirring to adjust the pH to 9, and the precipitate produced was filtrated and washed. The obtained precipitate was dried at 120° C. for 12 hours in an air stream, pulverized, graded to 12 to 22 mesh, calcined at 400° C. for 3 hours in a nitrogen stream, and subsequently calcined in a muffle furnace at 650° C. for 3 hours in an air stream to obtain a spinel crystalline composite oxide. With 4.77 g of distilled water, 8.17 g of a 21.4% rhodium nitrate solution (Rh(NO$_3$)$_3$ aq.) was mixed. Thereto, the spinel crystalline composite oxide prepared above was added, impregnated with the whole amount, and evaporation-dried to the bone in a hot bath at 90° C. The obtained catalyst precursor was dried in air at 120° C. for 12 hours and then subjected to hydrogen reduction at 400° C. for 3 hours to obtain a MgAl$_2$O$_4$ catalyst having supported thereon 5% by mass of Rh and 17% by mass of Mg.

EXAMPLE 3

Catalyst Preparation Example 3

To 30.00 g of boehmite powder (produced by Condea), an aqueous solution having dissolved therein 21.37 g of magnesium nitrate (Mg(NO$_3$)$_2$.6H$_2$O ) was added and kneaded in a kneader. After the kneading, the kneaded material was dried at 120° C. for 12 hours in an air stream, pulverized, graded to 12 to 22 mesh, calcined at 400° C. for 3 hours in a nitrogen stream, and subsequently calcined in a muffle furnace at 650° C. for 3 hours in an air stream to obtain a spinel crystalline composite oxide.

With 3.14 g of distilled water, 3.32 g of a 21.4% rhodium nitrate solution (Rh(NO$_3$)$_3$ aq.) was mixed. Thereto, the spinel crystalline composite oxide prepared above was added, impregnated with the whole amount, and evaporation-dried to the bone in a hot bath at 90° C. The obtained catalyst precursor was dried in air at 120° C. for 12 hours and then subjected to hydrogen reduction at 400° C. for 3 hours to obtain a MgAl$_2$O$_4$ catalyst having supported thereon 5% by mass of Rh and 17% by mass of Mg.

EXAMPLE 4

Catalyst Preparation Example 4

In 4.37 g of distilled water, 0.123 g of zinc nitrate (Zn(NO$_3$)$_2$.6H$_2$O) was dissolved. Thereto, 4.00 g of alumina support was added and impregnated with the whole amount, and evaporation-dried to the bone in a hot bath at 90° C. The obtained support was dried in air at 120° C. for 12 hours, calcined at 400° C. for 3 hours in a nitrogen stream, and subsequently calcined in a muffle furnace at 650° C. for 3 hours in an air stream to obtain a zinc-containing alumina support. With 1.78 g of distilled water, 2.55 g of a 21.4% rhodium nitrate solution (Rh(NO$_3$)$_3$ aq.) was mixed and thereto, the zinc-containing alumina support prepared above was added, impregnated with the whole amount, and evaporation-dried to the bone in a hot bath at 90° C. The obtained catalyst precursor was dried in air at 120° C. for 12 hours and then subjected to hydrogen reduction at 400° C. for 3 hours to obtain a catalyst containing ZnAl$_2$O$_4$ where 5% by mass of Rh and 0.7% by mass of Zn were supported on alumina.

EXAMPLE 5

Catalyst Preparation Example 5

A catalyst containing FeAl$_2$O$_4$ where 5% by mass of Rh and 0.6% by mass of Fe were supported on alumina was obtained in the same manner as in Example 4 except for using 0.160 g of iron nitrate (Fe(NO$_3$)$_2$.9H$_2$O) in place of zinc nitrate.

EXAMPLE 6

Catalyst Preparation Example 6

A catalyst containing MnAl$_2$O$_4$ where 5% by mass of Rh and 0.6% by mass of Mn were supported on alumina was obtained in the same manner as in Example 4 except for using 0.115 g of manganese nitrate (Mn(NO$_3$)$_2$.6H$_2$O) in place of zinc nitrate.

EXAMPLE 7

Catalyst Preparation Example 7

A catalyst containing NiAl$_2$O$_4$ where 5% by mass of Rh and 0.6% by mass of Ni were supported on alumina was obtained in the same manner as in Example 4 except for using 0.116 g of nickel nitrate (Ni(NO$_3$)$_2$.6H$_2$O) in place of zinc nitrate.

EXAMPLE 8

Catalyst Preparation Example 8

In 1.44 g of distilled water, 0.110 g of magnesium nitrate (Mg(NO$_3$)$_2$.6H$_2$O ) and 0.322 g of aluminum nitrate (Al(NO$_3$)$_2$.9H$_2$O ) were dissolved. Thereto, 4.00 g of zirconia support (produced by N. E. CHEMCAT) was added, impregnated with the whole amount, and evaporation-dried to the bone in a hot bath at 90° C. The obtained support was dried at 120° C. for 12 hours in air, calcined at 400° C. for 3 hours in a nitrogen stream, and subsequently calcined in a muffle furnace at 650° C. for 3 hours in an air stream to obtain a zirconia support containing magnesium and aluminum.

To 2.59 g of a 21.4% rhodium nitrate solution (Rh(NO$_3$)$_3$ aq.), this zirconia support containing magnesium and aluminum was added, impregnated with the whole amount, and evaporation-dried to the bone in a hot bath at 90° C. The obtained catalyst precursor was dried in air at 120° C. for 12 hours and then subjected to hydrogen reduction at 400° C. for 3 hours to obtain a catalyst having supported 5% by mass of Rh on $MgAl_2O_4/ZrO_2$ (Mg content: 0.2% by mass).

EXAMPLE 9

Catalyst Preparation Example 9

A catalyst having supported 5% by mass of Rh on $MgAl_2O_4/TiO_2$ (Mg content: 0.2% by mass) was obtained in the same manner as in Example 8 except for using 4.00 g of titania support (produced by Sakai Kagaku) in place of zirconia support.

EXAMPLE 10

Catalyst Preparation Example 10

A catalyst having supported 5% by mass of Rh on $MgAl_2O_4/SnO_2$ (Mg content: 0.2% by mass) was obtained in the same manner as in Example 8 except for using 4.00 g of tin oxide (produced by N. E. CHEMCAT) in place of zirconia support.

EXAMPLE 11

Catalyst Preparation Example 11

In 300 g of distilled water, 0.258 g of magnesium nitrate $(Mg(N_3)_2.6H_2O)$ 0.755 g of aluminum nitrate $(Al(NO_3)_3.9H_2O)$ and 21.71 g of cerium nitrate $(Ce(NO_3)_3.6H_2O)$ were dissolved. Thereto, aqueous ammonia was added while stirring to adjust the pH to 9 and the produced precipitate was filtered and washed. The obtained precipitate was dried at 120° C. for 12 hours in an air stream, pulverized, graded to 12 to 22 mesh, calcined at 400° C. for 3 hours in a nitrogen stream, and subsequently calcined in a muffle furnace at 650° C. for 3 hours in an air stream to obtain a spinel crystalline composite oxide. With 1.61 g of distilled water, 2.76 g of a 21.4% rhodium nitrate solution $(Rh(NO_3)_3$ aq.) was mixed and thereto, 4.0 g of the spinel crystalline composite oxide prepared above was added, impregnated with the whole amount, and evaporation-dried to the bone in a hot bath at 90° C. The obtained catalyst precursor was dried in air at 120° C. for 12 hours and then subjected to hydrogen reduction at 400° C. for 3 hours to obtain a catalyst having supported 5% by mass of Rh on $MgAl_2O_4/CeO_2$ (Mg content: 0.3% by mass).

EXAMPLE 12

Catalyst Preparation Example 12

A catalyst having supported 5% by mass of Rh on $ZnAl_2O_4/ZrO_2$ (Zn content: 0.5% by mass) was obtained in the same manner as in Example 8 except for using 0.102 g of zinc nitrate $(Zn(NO_3)_2.6H_2O)$ in place of magnesium nitrate and 0.249 g of aluminum nitrate $(Al(NO_3)_2.9H_2O)$.

EXAMPLE 13

Catalyst Preparation Example 13

A catalyst having supported 5% by mass of Rh on $ZnAl_2O_4/TiO_2$ (Zn content: 0.9% by mass) was obtained in the same manner as in Example 9 except for using 0.157 g of zinc nitrate $(Zn(NO_3)_2.6H_2O)$ in place of magnesium nitrate and 0.404 g of aluminum nitrate $(Al(NO_3)_2.9H_2O)$.

EXAMPLE 14

Catalyst Preparation Example 14

A catalyst having supported 5% by mass of Rh on $ZnAl_2O_4/SnO_2$ (Zn content: 0.5% by mass) was obtained in the same manner as in Example 10 except for using 0.083 g of zinc nitrate $(Zn(NO_3)_2.6H_2O)$ in place of magnesium nitrate and 0.203 g of aluminum nitrate $(Al(NO_3)_2.9H_2O)$.

EXAMPLE 15

Catalyst Preparation Example 15

A catalyst having supported 5% by mass of Rh on $ZnAl_2O_4/CeO_2$ (Zn content: 1.5% by mass) was obtained in the same manner as in Example 11 except for using 0.600 g of zinc nitrate $(Zn(NO_3)_2.6H_2O)$ in place of magnesium nitrate.

EXAMPLE 16

Decomposition Example 1 of Nitrous Oxide

The catalyst obtained in Example 1 was packed into a stainless steel-made tube having an inner diameter of 1.9 cm to prepare a reactor. This reactor was placed in an electric furnace. By setting the reaction temperature to 350° C. or 400° C. and the space velocity to 10,000 $Hr^{-1}$, a reaction gas having a gas composition of $N_2O/O_2/N_2=5/20/75$ (vol %) was fed and the amount of nitrous oxide was analyzed by gas chromatography at the reactor inlet and outlet. The results are shown in Table 1. The total concentration of nitrogen dioxide and nitrogen monoxide when the decomposition percentage of nitrous oxide was >99% was measured by an indicator tube and found to be <0.1 ppm.

EXAMPLE 17

Decomposition Example 2 of Nitrous Oxide

The evaluation of a catalyst was performed in the same manner as in Example 16 except that the catalyst obtained in Example 2 was used. The results are shown in Table 1. The total concentration of nitrogen dioxide and nitrogen monoxide was <0.1 ppm when the decomposition percentage of nitrous oxide was >99%.

EXAMPLE 18

Decomposition Example 3 of Nitrous Oxide

The evaluation of a catalyst was performed in the same manner as in Example 16 except that the catalyst obtained in Example 3 was used. The results are shown in Table 1. The total concentration of nitrogen dioxide and nitrogen monoxide was 0.2 ppm when the decomposition percentage of nitrous oxide was >99%.

EXAMPLE 19

Decomposition Example 4 of Nitrous Oxide

The evaluation of a catalyst was performed in the same manner as in Example 16 except that the catalyst obtained in Example 4 was used. The results are shown in Table 1. The total concentration of nitrogen dioxide and nitrogen monoxide was <0.1 ppm when the decomposition percentage of nitrous oxide was >99%.

EXAMPLE 20

Decomposition Example 5 of Nitrous Oxide

The evaluation of a catalyst was performed in the same manner as in Example 16 except that the catalyst obtained in Example 5 was used. The results are shown in Table 1. The total concentration of nitrogen dioxide and nitrogen monoxide was <0.1 ppm when the decomposition percentage of nitrous oxide was >99%.

EXAMPLE 21

Decomposition Example 6 of Nitrous Oxide

The evaluation of a catalyst was performed in the same manner as in Example 16 except that the catalyst obtained in Example 6 was used. The results are shown in Table 1. The total concentration of nitrogen dioxide and nitrogen monoxide was <0.1 ppm when the decomposition percentage of nitrous oxide was >99%.

EXAMPLE 22

Decomposition Example 7 of Nitrous Oxide

The evaluation of a catalyst was performed in the same manner as in Example 16 except that the catalyst obtained in Example 7 was used. The results are shown in Table 1. The total concentration of nitrogen dioxide and nitrogen monoxide was <0.1 ppm when the decomposition percentage of nitrous oxide was >99%.

EXAMPLE 23

Decomposition Example 8 of Nitrous Oxide

The evaluation of a catalyst was performed in the same manner as in Example 16 except that the catalyst obtained in Example 8 was used. The results are shown in Table 1. The total concentration of nitrogen dioxide and nitrogen monoxide was <0.1 ppm when the decomposition percentage of nitrous oxide was >99%.

EXAMPLE 24

Decomposition Example 9 of Nitrous Oxide

The evaluation of a catalyst was performed in the same manner as in Example 16 except that the catalyst obtained in Example 9 was used. The results are shown in Table 1. The total concentration of nitrogen dioxide and nitrogen monoxide was <0.1 ppm when the decomposition percentage of nitrous oxide was >99%.

EXAMPLE 25

Decomposition Example 10 of Nitrous Oxide

The evaluation of a catalyst was performed in the same manner as in Example 16 except that the catalyst obtained in Example 10 was used. The results are shown in Table 1. The total concentration of nitrogen dioxide and nitrogen monoxide was <0.1 ppm when the decomposition percentage of nitrous oxide was >99%.

EXAMPLE 26

Decomposition Example 11 of Nitrous Oxide

The evaluation of a catalyst was performed in the same manner as in Example 16 except that the catalyst obtained in Example 11 was used. The results are shown in Table 1. The total concentration of nitrogen dioxide and nitrogen monoxide was 0.2 ppm when the decomposition percentage of nitrous oxide was >99%.

EXAMPLE 27

Decomposition Example 12 of Nitrous Oxide

The evaluation of a catalyst was performed in the same manner as in Example 16 except that the catalyst obtained in Example 12 was used. The results are shown in Table 1. The total concentration of nitrogen dioxide and nitrogen monoxide was <0.1 ppm when the decomposition percentage of nitrous oxide was >99%.

EXAMPLE 28

Decomposition Example 13 of Nitrous Oxide

The evaluation of a catalyst was performed in the same manner as in Example 16 except that the catalyst obtained in Example 13 was used. The results are shown in Table 1. The total concentration of nitrogen dioxide and nitrogen monoxide was <0.1 ppm when the decomposition percentage of nitrous oxide was >99%.

EXAMPLE 29

Decomposition Example 14 of Nitrous Oxide

The evaluation of a catalyst was performed in the same manner as in Example 16 except that the catalyst obtained in Example 14 was used. The results are shown in Table 1. The total concentration of nitrogen dioxide and nitrogen monoxide was <0.1 ppm when the decomposition percentage of nitrous oxide was >99%.

EXAMPLE 30

Decomposition Example 15 of Nitrous Oxide

The evaluation of a catalyst was performed in the same manner as in Example 16 except that the catalyst obtained in Example 15 was used. The results are shown in Table 1. The total concentration of nitrogen dioxide and nitrogen monoxide was 0.2 ppm when the decomposition percentage of nitrous oxide was >99%.

COMPARATIVE EXAMPLE 1

With 1.32 g of a 21.4% rhodium nitrate solution (Rh $(NO_3)_3$ aq.), 2.18 g of distilled water was mixed. Thereto, 2.04 g of an alumina support was added and evaporation-dried to the bone in a hot bath at 90° C. The obtained support was dried in air at 120° C. for 12 hours and then subjected to hydrogen reduction at 400° C. for 3 hours to obtain a catalyst where 5% by mass of Rh was supported on alumina.

COMPARATIVE EXAMPLE 2

A catalyst where 5% by mass of Rh and 1.2% by mass of La were supported on alumina was obtained in the same manner as in Example 1 except for using 0.087 g of lanthanum nitrate $(La(NO_3)_2 \cdot 6H_2O)$ in place of magnesium nitrate.

COMPARATIVE EXAMPLE 3

A catalyst where 5% by mass of Pd was supported on alumina was obtained in the same manner as in Comparative Example 1 except for using 0.29 g of palladium nitrate-n-hydrate $(Pd(NO_3)_2 \cdot nH_2O)$ in place of rhodium nitrate.

COMPARATIVE EXAMPLE 4

The evaluation of a catalyst was performed in the same manner as in Example 16 except that the catalyst obtained in Comparative Example 1 was used. The results are shown in Table 1. The total concentration of nitrogen dioxide and nitrogen monoxide was 4 ppm when the decomposition percentage of nitrous oxide was >99%.

COMPARATIVE EXAMPLE 5

The evaluation of a catalyst was performed in the same manner as in Example 16 except that the catalyst obtained in Comparative Example 2 was used. The results are shown in Table 1. The total concentration of nitrogen dioxide and nitrogen monoxide was 12 ppm when the decomposition percentage of nitrous oxide was >99%.

TABLE 1

| | Decomposition Percentage of Nitrous Oxide (%) | | Amount of NOx |
|---|---|---|---|
| | 350° C. | 400° C. | Generated (ppm) |
| Example 16 | >99 | >99 | <0.1 |
| Example 17 | >99 | >99 | <0.1 |
| Example 18 | >99 | >99 | 0.2 |
| Example 19 | >99 | >99 | <0.1 |
| Example 20 | >99 | >99 | <0.1 |
| Example 21 | >99 | >99 | <0.1 |
| Example 22 | >99 | >99 | <0.1 |
| Example 23 | >99 | >99 | <0.1 |
| Example 24 | 92 | >99 | <0.1 |
| Example 25 | >99 | >99 | <0.1 |
| Example 26 | 90 | >99 | 0.2 |
| Example 27 | >99 | >99 | <0.1 |
| Example 28 | 92 | >99 | <0.1 |
| Example 29 | >99 | >99 | <0.1 |
| Example 30 | 91 | >99 | 0.2 |
| Comparative Example 4 | >99 | >99 | 4.0 |
| Comparative Example 5 | 97 | >99 | 12 |

Reaction conditions: $N_2O/O_2/N_2 = 5/20/75$, $SV = 10,000\ Hr^{-1}$

EXAMPLE 31

Decomposition Example 16 of Nitrous Oxide

Into a reaction gas, 3% water vapor was added to allow a decomposition reaction of nitrous oxide to proceed at 350° C. for 3 hours. Thereafter, the feeding of water vapor was stopped and the evaluation of the catalyst obtained in Example 1 was performed in the same manner as in Example 16. The results are shown in Table 2. The decomposition percentage of nitrous oxide at 350° C. was >99% both before and after the addition of water vapor and thus, not changed.

COMPARATIVE EXAMPLE 6

The evaluation of a catalyst was performed in the same manner as in Example 31 except that the catalyst obtained in Comparative Example 3 was used. The results are shown in Table 2. The decomposition percentage of nitrous oxide at 350° C. was 42% before the addition of water vapor and decreased to 18% after the addition.

TABLE 2

| | Decomposition Percentage of Nitrous Oxide at 350° C. (%) | |
|---|---|---|
| | Before Treatment with Water Vapor | After Treatment with Water Vapor |
| Example 31 | >99 | >99 |
| Comparative Example 6 | 42 | 18 |

Reaction conditions: $N_2O/O_2/N_2 = 5/20/75$, $SV = 10,000\ Hr^{-1}$

Industrial Applicability

As described in the foregoing pages, by using the catalyst for decomposing nitrous oxide of the present invention, nitrous oxide contained in an exhaust gas discharged from factories or incineration facilities or contained in an anesthetic gas can be efficiently decomposed at a relatively low temperature and the amount of NOx generated at the decomposition can be reduced.

What is claimed is:

1. A catalyst for decomposing nitrous oxide, comprising a support having supported thereon rhodium, said support consisting essentially of a spinel crystalline composite oxide formed by magnesium and at least a part of aluminum, wherein aluminum is contained in an atomic ratio of 2 or more to magnesium, magnesium is contained in an amount of 0.1 to 20.0% by mass based on the catalyst as a whole and rhodium is contained in an amount of 0.05 to 10% by mass based on the catalyst as a whole.

2. A process for producing a catalyst for decomposing nitrous oxide described in claim 1, comprising the following three steps:
   (1) a step of loading aluminum and magnesium on a support;
   (2) a step of calcining the support having supported thereon aluminum and magnesium obtained in the step (1); and
   (3) a step of loading rhodium on the calcined support obtained in the step (2) and then calcining the support.

3. The process for producing a catalyst for decomposing nitrous oxide as claimed in claim 2, wherein the support is at least one support selected from the group consisting of alumina, silica, zirconia, ceria, titania and tin oxide.

4. A process for producing a catalyst for decomposing nitrous oxide described in claim 1, comprising the following three steps:
   (1) a step of loading magnesium on an alumina support;
   (2) a step of calcining the support having supported thereon magnesium obtained in the step (1);
   (3) a step of loading rhodium on the calcined support obtained in the step (2) and then calcining the support.

5. A process for producing a catalyst for decomposing nitrous oxide described in claim 1, comprising the following three steps:
   (1) a step of neutralization-precipitating an aluminum salt and a magnesium salt;
   (2) a step of calcining the precipitate obtained in the step (1); and
   (3) a step of loading rhodium on the calcined material obtained in the step (2) and then calcining the material.

6. A process for producing a catalyst for decomposing nitrous oxide described in claim 1, comprising the following three steps:
   (1) a step of mixing alumina and/or aluminum hydroxide with magnesium oxide, magnesium hydroxide and/or magnesium salt;
   (2) a step of calcining the mixture obtained in the step (1); and
   (3) a step of loading rhodium on the calcined material obtained in the step (2) and then calcining the material.

7. A catalyst for decomposing nitrous oxide, comprising a support having supported thereon rhodium, said support comprising a spinel crystalline composite oxide formed by at least a part of aluminum and at least one metal selected from the group consisting of zinc, iron, manganese and nickel.

8. The catalyst for decomposing nitrous oxide as claimed in claim 7, wherein aluminum is contained in an atomic ratio of 2 or more to the at least one metal selected from the group consisting of zinc, iron, manganese and nickel.

9. The catalyst for decomposing nitrous oxide as claimed in claim 7, wherein the at least one metal selected from the group consisting of zinc, iron, manganese and nickel is contained in an amount of 0.1 to 40.0% by mass based on the catalyst as a whole.

10. The catalyst for decomposing nitrous oxide as claimed in claim 7, wherein rhodium is contained in an amount of 0.05 to 10% by mass based on the catalyst as a whole.

11. The catalyst for decomposing nitrous oxide as claimed in claim 1 or 7, wherein the amount of NOx generated at the decomposition of nitrous oxide is 1 ppm or less.

12. A process for producing a catalyst for decomposing nitrous oxide described in claim 7, comprising the following three steps:
  (1) a step of loading aluminum and at least one metal selected from the group consisting of zinc, iron, manganese and nickel on a support;
  (2) a step of calcining the support having supported thereon aluminum and at least one metal selected from the group consisting of zinc, iron, manganese and nickel, obtained in the step (1); and
  (3) a step of loading rhodium on the calcined support obtained in the step (2) and then calcining the support.

13. The process for producing a catalyst for decomposing nitrous oxide as claimed in claim 12, wherein the support is at least one support selected from the group consisting of alumina, zirconia, ceria, titania and tin oxide.

14. The process for producing a catalyst for decomposing nitrous oxide as claimed in claim 12, wherein aluminum is supported in an atomic ratio of 2 or more to the at least one metal selected from the group consisting of zinc, iron, manganese and nickel.

15. The process for producing a catalyst for decomposing nitrous oxide as claimed in claim 12, wherein the amount supported of the at least one metal selected from the group consisting of zinc, iron, manganese and nickel is from 0.1 to 40.0% by mass based on the catalyst as a whole.

16. The process for producing a catalyst for decomposing nitrous oxide as claimed in claim 12, wherein the amount of rhodium supported is from 0.05 to 10% by mass based on the catalyst as a whole.

17. A process for producing a catalyst for decomposing nitrous oxide described in claim 7, comprising the following three steps:
  (1) a step of loading at least one metal selected from the group consisting of zinc, iron, manganese and nickel on an alumina support;
  (2) a step of calcining the support having supported thereon at least one metal selected from the group consisting of zinc, iron, manganese and nickel, obtained in the step (1);
  (3) a step of loading rhodium on the calcined support obtained in the step (2) and then calcining the support.

18. The process for producing a catalyst for decomposing nitrous oxide as claimed in claim 17, wherein the amount supported of at least one metal selected from the group consisting of zinc, iron, manganese and nickel is ½ or less in terms of the atomic ratio to aluminum.

19. The process for producing a catalyst for decomposing nitrous oxide as claimed in claim 17, wherein the amount supported of the at least one metal selected from the group consisting of zinc, iron, manganese and nickel is from 0.1 to 40.0% by mass based on the catalyst as a whole.

20. The process for producing a catalyst for decomposing nitrous oxide as claimed in claim 17, wherein the amount of rhodium supported is from 0.05 to 10% by mass based on the catalyst as a whole.

21. A process for producing a catalyst for decomposing nitrous oxide described in claim 7, comprising the following three steps:
  (1) a step of neutralization-precipitating an aluminum salt and at least one metal salt selected from the group consisting of zinc, iron, manganese and nickel;
  (2) a step of calcining the precipitate obtained in the step (1); and
  (3) a step of loading rhodium on the calcined material obtained in the step (2) and then calcining the material.

22. The process for producing a catalyst for decomposing nitrous oxide as claimed in claim 21, wherein aluminum is contained in an atomic ratio of 2 or more to the at least one metal selected from the group consisting of zinc, iron, manganese and nickel.

23. The process for producing a catalyst for decomposing nitrous oxide as claimed in claim 21, wherein at least one metal selected from the group consisting of zinc, iron, manganese and nickel is contained in an amount of 0.1 to 40.0% by mass based on the catalyst as a whole.

24. The process for producing a catalyst for decomposing nitrous oxide as claimed in claim 21, wherein the amount of rhodium supported is from 0.05 to 10% by mass based on the catalyst as a whole.

25. A process for producing a catalyst for decomposing nitrous oxide described in claim 7, comprising the following three steps:
  (1) a step of mixing alumina and/or aluminum hydroxide with an oxide, a hydroxide and/or a metal salt of at least one metal selected from the group consisting of zinc, iron, manganese and nickel;
  (2) a step of calcining the mixture obtained in the step (1); and
  (3) a step of loading rhodium on the calcined material obtained in the step (2) and then calcining the material.

26. The process for producing a catalyst for decomposing nitrous oxide as claimed in claim 25, wherein aluminum is contained in an atomic ratio of 2 or more to the at least one metal selected from the group consisting of zinc, iron, manganese and nickel.

27. The process for producing a catalyst for decomposing nitrous oxide as claimed in claim 25, wherein the at least one metal selected from the group consisting of zinc, iron, manganese and nickel is contained in an amount of 0.1 to 40.0% by mass based on the catalyst as a whole.

28. The process for producing a catalyst for decomposing nitrous oxide as claimed in claim 25, wherein the amount of rhodium supported is from 0.05 to 10% by mass based on the catalyst as a whole.

29. The process for producing a catalyst for decomposing nitrous oxide as claimed in claim 2, 4, 5, 6, 12, 17, 21, or 25, wherein the calcining temperature in the step (2) is from 400 to 9000° C.

30. The process for producing a catalyst for decomposing nitrous oxide as claimed in claim 2, 4, 5, 6, 12, 17, 21, or 25, wherein the calcining temperature in the step (3) is from 200 to 5000° C.

31. The process for producing a catalyst for decomposing nitrous oxide as claimed in claim 2, 4, 5, 6, 12, 17, 21, or 25, wherein a reduction treatment step is performed after the step (3).

32. The process for producing a catalyst for decomposing nitrous oxide as claimed in claim 31, wherein the reduction treatment step is hydrogen reduction treatment step.

33. The process for producing a catalyst for decomposing nitrous oxide as claimed in claim 32, wherein the hydrogen reduction treatment temperature is from 400 to 900° C.

34. A method for decomposing nitrous oxide, comprising contacting the catalyst for decomposing nitrous oxide described in any one of claims 1 and 7 to 10 with a gas containing nitrous oxide.

35. The method for decomposing nitrous oxide as claimed in claim 34, wherein the contacting temperature is from 200 to 600° C.

36. The method for decomposing nitrous oxide as claimed in claim 34, wherein the gas decomposed is nitrous oxide contained in an anesthetic gas and the concentration of nitrous oxide is 70% or less.

37. The method for decomposing nitrous oxide as claimed in claim 34, wherein the gas decomposed is nitrous oxide contained in an exhaust gas discharged from factories or incineration facilities and the concentration of nitrous oxide is 10% or less.

38. The method for decomposing nitrous oxide as claimed in claim 34, wherein the amount of NOx generated at the decomposition of nitrous oxide is 1 ppm or less.

39. A catalyst for decomposing nitrous oxide, comprising a support having supported thereon aluminum, rhodium and at least one metal selected from the group consisting of zinc, iron, manganese and nickel, and at least a part of aluminum forms a spinel crystalline composite oxide with at least one metal selected from the group consisting of zinc, iron, manganese and nickel.

40. The catalyst for decomposing nitrous oxide as claimed in claim 39, wherein the support is at least one support selected from the group consisting of alumina, zirconia, ceria, titania and tin oxide.

41. A catalyst for decomposing nitrous oxide, comprising an alumina support having supported thereon rhodium and at least one metal selected from the group consisting of zinc, iron, manganese and nickel, and at least a part of aluminum forms a spinel crystalline composite oxide with at least one metal selected from the group consisting of zinc, iron, manganese and nickel.

42. The catalyst for decomposing nitrous oxide as claimed in claim 39 or 41, wherein aluminum is contained in an atomic ratio of 2 or more to the at least one metal selected from the group consisting of zinc, iron, manganese and nickel.

43. The catalyst for decomposing nitrous oxide as claimed in claim 39 or 41, wherein the at least one metal selected from the group consisting of zinc, iron, manganese and nickel is contained in an amount of 0.1 to 40.0% by mass based on the catalyst as a whole.

44. The catalyst for decomposing nitrous oxide as claimed in claim 39 or 41, wherein rhodium is contained in an amount of 0.05 to 10% by mass based on the catalyst as a whole.

45. The catalyst for decomposing nitrous oxide as claimed in claim 39 or 41, wherein the amount of NOx generated at the decomposition of nitrous oxide is 1 ppm or less.

* * * * *